United States Patent [19]
Auld et al.

[11] Patent Number: 5,818,533
[45] Date of Patent: Oct. 6, 1998

[54] METHOD AND APPARATUS FOR DECODING B FRAMES IN VIDEO CODECS WITH MINIMAL MEMORY

[75] Inventors: David R. Auld, San Jose; Kwok Chau, Los Altos, both of Calif.

[73] Assignee: LSI Logic Corporation, Milpitas, Calif.

[21] Appl. No.: 689,300

[22] Filed: Aug. 8, 1996

[51] Int. Cl.$^6$ ........................................... H04N 7/36
[52] U.S. Cl. ..................... 348/412; 348/415; 348/715
[58] Field of Search ........................... 348/390, 412, 348/413, 415, 416, 714, 715, 716, 845.2; 328/232, 233, 236; 395/507, 509, 512, 521, 432, 433; H04N 7/36

[56] References Cited

U.S. PATENT DOCUMENTS

| | | | |
|---|---|---|---|
| 5,198,901 | 3/1993 | Lynch | 348/413 |
| 5,329,365 | 7/1994 | Uz | 348/415 |
| 5,646,693 | 7/1997 | Cismas | 348/714 |
| 5,717,461 | 2/1998 | Hoogenboom | 348/416 |

Primary Examiner—Howard Britton
Attorney, Agent, or Firm—Conley, Rose & Tayon; Jeffrey C. Hood

[57] ABSTRACT

An MPEG decoder system and method for decoding frames of a video sequence. The MPEG decoder includes frame reconstruction or decoder logic which operates to reconstruct a bi-directionally encoded (B) frame with minimal memory requirements. The MPEG decoder operates to decode or reconstruct the frame twice, once during each field display period. The picture reconstruction unit operates to decode or reconstruct the B frame twice, once each during a first field time and a second field time. The first field time substantially corresponds to the time when the first or top field of the picture is displayed, and the second field time substantially corresponds to the time when the second or bottom field of the picture is displayed. This obviates the necessity of storing the reconstructed B frame data, thus reducing memory requirements. The present invention also eliminates the storage requirement of the B-frame without substantially increasing the bandwidth required from external semiconductor memory when compared to prior art methods.

16 Claims, 10 Drawing Sheets

|  | Prior Art | Simple 2x | New method |
|---|---|---|---|
| Fwd motion comp. read luma* | 9.5625 | 19.125 | 19.125 |
| Bwd motion comp. read luma* | 9.5625 | 19.125 | 19.125 |
| Fwd motion comp. read chroma* | 5.0625 | 10.125 | 10.125 |
| Bwd motion comp. read chroma* | 5.0625 | 10.125 | 10.125 |
| Reconstruction write luma | 8.0 | 8.0 | 0 |
| Reconstruction write chroma | 4.0 | 4.0 | 0 |
| Display read luma | 8.0 | 8.0 | 0 |
| Display read chroma | 8.0 | 8.0 | 0 |
| Total | 57.25 | 86.5 | 58.5 |

FIG. 9

METHOD AND APPARATUS FOR DECODING B FRAMES IN VIDEO CODECS WITH MINIMAL MEMORY

INCORPORATION BY REFERENCE

The following references are hereby incorporated by reference.

The ISO/IEC MPEG specification referred to as ISO/IEC 13818 is hereby incorporated by reference in its entirety.

U.S. patent application Ser. No. 08/654,321 titled "Method and Apparatus for Segmenting Memory to Reduce the Memory Required for Bidirectionally Predictive-Coded Frames" and filed May 27, 1996 is hereby incorporated by reference in its entirety as though fully and completely set forth herein.

U.S. patent application Ser. No. 08/653,845 titled "Method and Apparatus for Reducing the Memory Required for Decoding Bidirectionally Predictive-Coded Frames During Pull-Down" and filed May 27, 1996 is hereby incorporated by reference in its entirety as though fully and completely set forth herein.

FIELD OF THE INVENTION

The present invention relates generally to digital video compression, and more particularly to a system for decoding B frames with minimal memory by decoding the B frame more than once, thereby eliminating the need to store the B frame.

DESCRIPTION OF THE RELATED ART

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress fill motion video, As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of fill motion video images which uses the interframe and intraframe compression techniques described above. MPEG compression uses both motion compensation and discrete cosine transform (DCT) processes, among others, and can yield compression ratios of more tan 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I or Intraframes contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for a best fit or best match between the target picture macroblock and a block in a neighboring picture, referred to as a search frame. For a target P frame, the encoder searches in a prior I or P frame. For a target B frame, the encoder searches in a prior or subsequent I or P frame. When a best match is found, the encoder transmits a vector movement code or motion vector. The vector movement code or motion vector includes a pointer to the best fit search frame block as well as information on the difference between the best fit block and the respective target block. The blocks in target pictures that have no change relative to the block in the reference or search frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub-blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is s divided into non-overlapping blocks and respective sub-blocks, and each block is transformed via the discrete cosine transform (DCT).

After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Zero run length encoding is used to transmit the quantized values. To further enhance compression, the blocks are scanned in a zig-zag ordering that scans the lower frequency entries first, and the non-zero quantized values, along with the zero run lengths, are entropy encoded.

Because of the picture dependencies, i.e., the temporal compression, the order in which the frames are transmitted, stored, or retrieved, is not necessarily the display order, but rather an order required by the decoder to properly decode the pictures in the bitstream. For example, a typical sequence of frames, in display order, might be shown as follows:

```
I  B  B  P  B  B  P  B  B  P  B  B  I  B  B  P  B  B  P
0  1  2  3  4  5  6  7  8  9  10 11 12 13 14 15 16 17 18
```

By contrast, the bitstream order corresponding to the given display order would be as follows:

```
I  P  B  B  P  B  B  P  B  B  I  B  B  P  B  B  P  B  B
0  3  1  2  6  4  5  9  7  8  12 10 11 15 13 14 18 16 17
```

Because the B frame depends on a subsequent I or P frame in display order, the I or P frame must be transmitted and decoded before the dependent B frame.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms, In general, motion estimation is the task of identifying temporal redundancy between frames of the video sequence.

The video decoding process is generally the inverse of the video encoding process and is employed to reconstruct a motion picture sequence from a compressed and encoded bitstream. The data in the bitstream is decoded according to a syntax that is defined by the data compression algorithm. The decoder must first identify the beginning of a coded picture, identify the type of picture, then decode each individual macroblock within a particular picture.

When encoded video data is transferred to a video decoder, the encoded video data is received and stored in a rate or channel buffer. The data is then retrieved from the channel buffer by a decoder or reconstruction device for performing the decoding process. When the MPEG decoder receives the encoded stream, the MPEG decoder reverses the above operations. Thus the MPEG decoder performs inverse scanning to remove the zig zag ordering inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a reconstructed frame is a reference or anchor frame, such as an I or a P frame, the reconstructed frame replaces the oldest stored anchor frame and is used as the new anchor for subsequent frames.

When a temporally compressed or encoded frame is received, such as a P or B frame, motion compensation is performed on the frame using the neighboring decoded I or P reference frames, also called anchor frames. The temporally compressed or encoded frame, referred to as a target frame, will include motion vectors which reference blocks in neighboring decoded I or P frames stored in the memory. The MPEG decoder examines the motion vector, determines the respective reference block in the reference frame, and accesses the reference block pointed to by the motion vector from the memory.

In order to reconstruct a B frame, the two related anchor frames or reference frames must be decoded and available in a memory, referred to as the picture buffer. This is necessary since the B frame was encoded relative to these two anchor frames. Thus the B frame must be interpolated or reconstructed using both anchor frames during the reconstruction process.

After all of the macroblocks have been processed by the decoder, the picture reconstruction is complete. The resultant coefficient data is then inverse quantized and operated on by an IDCT process to transform the macroblock data from the frequency domain to data in the time and space domain. As noted above, the frames may also need to be re-ordered before they are displayed in accordance with their display order instead of their coding order. After the frames are re-ordered, they may then be displayed on an appropriate display device.

As described above, as the encoded video data is decoded, the decoded data is stored into a picture store buffer. In some configurations, the channel and picture buffers are incorporated into a single integrated memory buffer. The decoded data is in the form of decompressed or decoded I, P or B frames. A display controller retrieves the picture data for display by an appropriate display device, such as a TV monitor or the like.

A television picture is typically comprised of two fields, referred to as the top and bottom field. The top field contains every other scan line in the picture beginning with the first scan line. The bottom field contains every other line beginning with the second line. In other words, the top field comprises the odd horizontal scan lines, and the bottom field comprises the even horizontal scan lines. A television scans or draws all the top field lines, followed by all the bottom field lines, in an interlaced fashion.

A picture encoded using the MPEG2 coding standard may be encoded in either a progressive or interlaced format, referred to as a frame picture structure or field picture structure, respectively. Where a video sequence is encoded using the frame structure picture, i.e., in a progressive format, problems arise in the decoding because the frame structure picture is required to be decoded in progressive scan sequence and is displayed in the interlaced sequence. This requires that the frame being reconstructed must be stored temporarily until it is displayed. In current prior art implementations, a full frame store is used to store the frame. Further, there is a field delay between reconstruction and display. The delay is required so that the bottom of the picture can be fully reconstructed by the time it has been displayed at the end of the first field. This latter relationship sets the lower bound of the frame store to about 0.5 frames in systems in which the picture is decoded only once.

In other words, macroblocks include information for both even and odd fields for each frame, and reconstruction of each B frame is required to be performed progressively, or in a non-interlaced order. However, display of each frame is in an interlaced order, where an entire first field is displayed first before beginning display of the second field. Thus, B frame reconstruction must lead the display of the B frame by at least half a frame, and the reconstruction process must be completed to finish the display of the entire B frame.

Due to the progressive versus interlaced order between reconstruction and display, an entire memory frame was required in prior art systems to complete reconstruction of each B frame for display. Thus, prior art systems required at least three frame stores of memory. In other words, the picture buffer was required to store at least three frames of video information. Two frames of storage were necessary for storing two anchor frames. A third frame of storage was required to store the frame being reconstructed. The two anchor frames were used to reconstruct the B frame into the third frame storage area.

The present disclosure primarily concerns MPEG-2 decoders compliant with International Standards Organization / International Electro-technical Commission (ISO/IEC) 2-13818 for supporting NTSC (National Television Standards Committee) or PAL Chase Alternating Line) standards. The NTSC resolution is 720×480 picture elements (pixels) and the PAL resolution is 720×576 pixels per frame. The picture rate is 24 to 30 frames per second. At a sampling rate of 4:2:0, each frame requires an average of 12 bits per pixel. For memory devices, such as a dynamic random access memory (DRAM), each PAL type frame requires 4,976,640 bits of storage and each N'TSC frame requires 4,147,200 bits of storage, The NTSC standard is primarily for use in the United States (U.S.), whereas the PAL standard is primarily for use in Europe. Since prior art systems require a minimum of three frames of storage, a PAL system requires at least 3×4,976,640=14,929,920 bits (14.9 Mb) of memory. An N'TSC system requires at least 3×4,147,200= 12,441,600 bits (12.5 Mb) of memory. Furthermore, additional memory was required for the channel buffer, as well as overhead storage area for performing a variety of miscellaneous overhead functions, where such overhead memory was either distributed in the decoder system or incorporated into the integrated memory.

The amount of memory is a major cost item in the production of video decoders. Thus, it is desired to reduce the memory requirements of the decoder system as much as possible to reduce its size and cost. Since practical memory devices are implemented using particular convenient discrete sizes, it is important to stay within a particular size if possible for commercial reasons. For example, it is desired to keep the memory requirements below a particular size of memory, such as 16 Mb, since otherwise a memory device of 24 or 32 Mb would have to be used, resulting in greater cost and extraneous storage area. Although it is possible to implement an NTSC decoder including three full frames of storage within a 16 Mb DRAM memory device, it is still desirable to reduce the memory requirements for NTSC decoders. However, due to the size of each frame, more than 16 Mb would be required to implement a PAL decoder including three full frame stores, the channel buffer and miscellaneous functions.

As discussed above, current prior art video decoder implementations use at least one frame of memory to store the reconstructed B-picture prior to display. In other words, prior art decoders require that there be a full frame store into which to reconstruct the B frame or picture.

U.S. patent application Ser. No. 08/654,321 titled "Method and Apparatus for Segmenting Memory to Reduce the Memory Required for bidirectionally Predictive-Coded Frames" and filed May 27, 1996 discloses a video decoder which use as little as 2.528 frame stores when there is no pulldown during B-frames. In this system, the amount of required memory is reduced whereby the memory used to store the first field is used again for reconstruction as soon as that part of the picture has been displayed. This method can reduce the amount of memory needed for B-frame reconstruction to about 0.528 frames.

U.S. patent application Ser. No. 08/653,845 titled "Method and Apparatus for Reducing the Memory Required for Decoding Bidirectionally Predictive-Coded Frames During Pull-Down" and filed May 27, 1996 discloses a video decoder which use as little as 2.75 frames when there is pulldown.

The video decoder systems disclosed in the above patent applications are known to be optimal, i.e., use the least possible memory, under the established constraints, and in which the picture is decoded only once. It has been speculated that implementations could theoretically use less memory if the picture was reconstructed more than once, but no embodiments currently exist. One difficulty is that existing semiconductor memory technology cannot provide the access time needed to reconstruct the picture more than once at reasonable cost.

Therefore, a video decoder system and method is desired which minimizes the required amount of memory used for reconstructing frames, such as B frames. A new system and method is desired which minimizes or reduces the amount of memory required to decode B frames in a video system.

SUMMARY OF THE INVENTION

The present invention comprises an MPEG decoder system and method for decoding frames of a video sequence. The MPEG decoder includes frame reconstruction or decoder logic which operates to reconstruct a bi-directionally encoded (B) frame with minimal memory requirements. The MPEG decoder operates to decode or reconstruct the frame twice, once during each field display period. This obviates the necessity of storing the reconstructed B frame data, thus reducing memory requirements.

The present invention preferably comprises a system including a video decoder or MPEG decoder which receives a compressed video file or video bitstream and generates a non-compressed or decoded video steam. The MPEG decoder system comprises a picture memory, a picture reconstruction unit, a picture display unit, a pointer register, and a temporary buffer. The picture memory includes separate buffers used for anchor pictures or reference frames (A1, A2) and a rate buffer which stores the temporally compressed frame, referred to as C. The pointer register stores the location of the first byte of the compressed picture, which is stored in the rate buffer. According to the present invention, the picture memory is not required to store data from the reconstructed frame.

The picture reconstruction unit operates to decode or reconstruct the B frame twice, once each during a first field time and a second field time. The first field time substantially corresponds to the time when the first or top field of the picture is displayed, and the second field time substantially corresponds to the time when the second or bottom field of the picture is displayed.

During the first field time, compressed picture data is read from the rate buffer into the picture reconstruction unit, where the picture is decoded. The top field data from the picture reconstruction unit is written to the temporary buffer, and the bottom field data is discarded. After one slice of the picture has been decoded, the data in the temporary buffer is retrieved by the picture display unit and is output for display. This process continues for the entire picture in order to display all of the first field. Thus, the entire picture is decoded or reconstructed, and only data from the top field is written to the temporary buffer for display.

During the second field time, the same compressed picture is again read from the rate buffer. The picture reconstruction unit again decodes the compressed picture. In the second field time, the picture reconstruction unit writes the bottom field data to the temporary buffer, and the top field data is discarded. After one slice of the picture has been decoded, the data in the temporary buffer is output by the picture display unit for display. This process continues for the entire picture in order to display all of the second field.

The reconstructed picture is never written to the memory during reconstruction of B-frames. It is also noted that the temporary buffer is about 32 times smaller than the external frame store required in the best implementation of prior art methods. This allows the temporary buffer to be comprised on the same monolithic substrate as the decoder itself.

Therefore, the present invention reconstructs the B-picture twice, once in each field time. The present invention thus eliminates the storage requirement of the B-frame entirely. The present invention eliminates the storage requirement of the B-frame without substantially increasing the bandwidth required from external semiconductor memory when compared to prior art methods. The present invention thus performs motion compensation or frame reconstruction with minimal memory requirements, thus providing comparable performance with reduced system cost.

BRIEF DESCRIPTION OF THE DRAWINGS

A better understanding of the present invention can be obtained when the following detailed description of the preferred embodiment is considered in conjunction with the following drawings, in which:

FIG. 9 is a table illustrating operation of the present invention compared to prior art methods.

DETAILED DESCRIPTION OF THE PREFERRED EMBODIMENT

Prior Art Decoder System Operation

Figure 1:
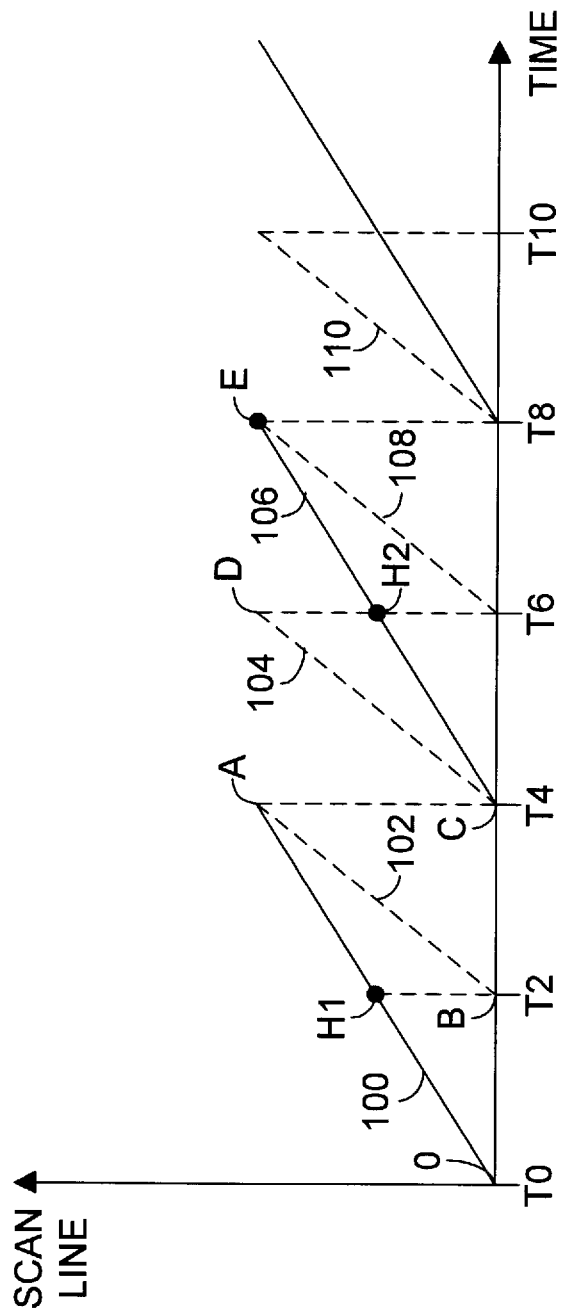
FIG. 1 is a graph illustrating operation of a video decoder system according to the prior art.

FIG. 1 is a graph illustrating operation of a decoder system operating according to prior art. Each of the scan lines forming a B frame are referenced along the y-axis and time is plotted along the x-axis of the graph. Between times T0 and T4, a first B frame, referred to as FR0, is reconstructed as illustrated with a solid line 100 plotted between the origin (O) and a point A of the graph. Such reconstruction occurs in a progressive manner, where each macroblock for each slice is reconstructed one at a time into a picture buffer (not shown). Each macroblock includes data for a contiguous 16-pixel by 16-line portion of the frame. Thus, each macroblock incorporates data for both fields, where the consecutive lines of data are stored at consecutive locations within the picture buffer. For both NTSC and PAL type decoders, 45 such macroblocks are reconstructed for each slice having a width of 720 pixels. For NTSC systems including 480 total scan lines, 30 slices are reconstructed for each frame for a total of 1,350 macroblocks per frame. For PAL systems including 576 total scan lines, 36 slices are reconstructed for each frame for a total of 1,620 macroblocks per frame. It is noted that PAL systems display 25 frames per second whereas N'TSC systems display 30 frames per second, so that each system reconstructs and displays about 40,500 macroblocks per second on the average.

At time T2, after reconstruction of approximately half of the first frame FR0 is completed as indicated by a point Hi, a display device (not shown) begins retrieving and displaying the first field of the first frame FR0, referred to as FR0–FD0. A dash-dot line 102 plotted between points B and A illustrates display of the first field FR0–FD0 of the first frame FR0, where such display completes at approximately time T4, On the average, reconstruction and display of each pixel occurs at roughly the same rate. However, reconstruction of each frame occurs progressively, line by line, whereas display occurs in an interlaced manner, or every other line corresponding to a field. Thus, the effective rate of display of each slice of scan lines is twice as fast as reconstruction for each macroblock row of pixel data. Since the display of the first field FR0–FD0 of the frame FR0 takes half the time as reconstruction of the entire frame FR0, the slope of the line 100 is about half that of the slope of line 102. However, only half of the frame FR0 has been displayed at time T4. Furthermore, it is noted that reconstruction of the last several lines of the last slice of the frame FR0 corresponding to the field FR0–FD0 is completed just prior to those same fines being displayed. In this manner, reconstruction and display are substantially locked together.

Beginning approximately at time T4, the display device begins retrieving and displaying the second field of the first frame FR0, referred to as field FR0–FD1. This is illustrated with a dashed line 104 plotted between points C and D, where display of the second field FR0–FD1 of the first frame FR0 is completed at approximately time T6. Also between times T4 and T8, reconstruction of a second frame FR1 occurs, as illustrated by a solid line 106 plotted between points C and E. Since a single frame store of memory is used, such reconstruction of the second frame FR1 overwrites the data for the first frame FR0. Thus, the displaying of the second field FR0–FD1 of the first frame FR0 must begin slightly before reconstruction begins of the second frame FR1, since otherwise the data for the second field FR0–FD1 would be overwritten by data for the second frame FR1. Such delay is relatively short, however, and could be the delay associated with a single macroblock of data. Since the display of the second field FR0–FD1 of the first frame FR0 occurs at twice the effective rate of reconstruction of the second frame FR1, such display and reconstruction proceeds concurrently between times T4 and T6 without interfering with each other.

At time T6, display of the second field FR0–FD1 of the first frame FR0 completes while reconstruction of the second FR1 is approximately half completed, as illustrated at point H2. Thus, at time T6, the entire first frame FR0 has been displayed, while half of the second frame FR1 has been reconstructed. Between times T6 and T8, display of the first field FR1–FD0 of the second frame FR1 is performed, as illustrated by a dash-dot line 108 between points F and E. Thus at time T8, reconstruction of the entire second frame FR1 and display of the first field FR1–FD0 of the second frame FR1 is completed. Display of the second field FR1–FD1 of the second frame FR1 begins at time T8 and ends at time T10, as illustrated by a dashed line 110. Reconstruction and display of a third and subsequent frames proceeds in a similar manner beginning at time T8.

A review of FIG. 1 reveals that one frame store of memory is sufficient for reconstructing and displaying B frames. First, since the display rate effectively occurs at twice the rate of reconstruction, display can begin on a field when reconstruction of the frame is only halfway completed, as long as such display and reconstruction complete at about the same time. Second, reconstruction of new data can begin in an area of memory almost at the same time as display of data in that same area of memory. As mentioned above, other prior art system use less memory for storage of reconstructed B frames. These other prior art systems use the fact that, after data in a memory area is displayed, that memory area is available for reconstruction. However, these prior ad systems still require a considerable amount of memory for storage of reconstructed B frames.

Video Compression System

Figure 2:
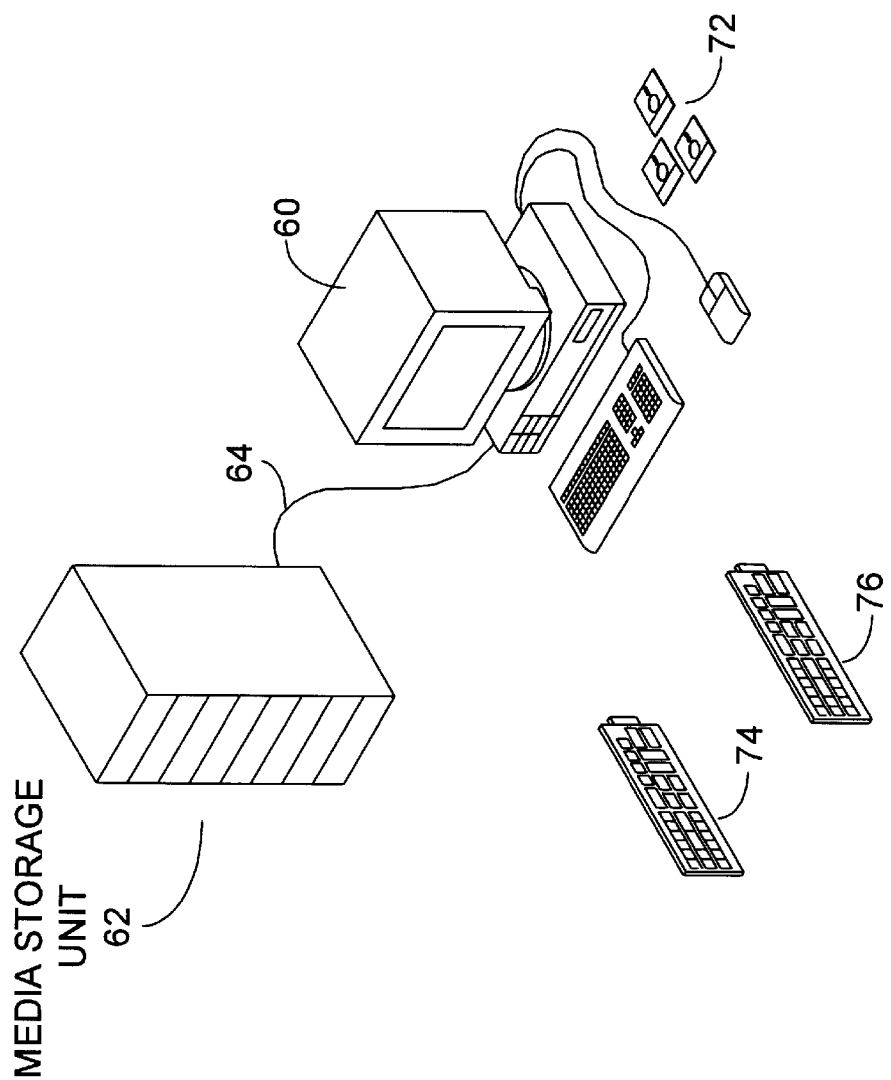
FIGS. 2 illustrates a computer system which performs video compression and including a video encoder which decodes B frames with minimal memory requirements according to the present invention.

Referring now to FIG. 2, a system for performing video decoding or decompression is shown which decodes bidirectionally interpolated frames with minimal memory according to the present invention. The system of the present invention performs motion compensation between temporally compressed frames of a video sequence during video decoding or video decompression. In other words, the system of the present invention receives motion estimation vectors representing blocks of a video frame and restores the compressed data during video decompression. However, the system of the present invention may be used to perform motion compensation or frame reconstruction for use in any of various types of applications, as desired.

As shown, in one embodiment the video decoding or decompression system comprises a general purpose computer system 60, The video decoding system may comprise any of various types of systems, including a computer system, set-top box, television, or other device.

The computer system 60 is preferably coupled to a media storage unit 62 which stores digital video files which are to be decompressed or decoded by the computer system 60. The media storage unit 62 may also store the resultant decoded or decompressed video file. In the preferred embodiment, the computer system 60 receives a compressed video file or bitstream and generates a normal uncompressed digital video file. In the present disclosure, the term "compressed video file" refers to a video file which has been compressed according to any of various video compression algorithms which use motion estimation techniques, including the MPEG standard, among others, and the term "uncompressed digital video file" refers to a stream of decoded or uncompressed video.

As shown, the computer system 60 preferably includes a video decoder 74 which performs video decoding or decompression operations. The video decoder 74 is preferably an MPEG decoder. The computer system 60 optionally may also include an MPEG encoder 76. The MPEG decoder 74 and MPEG encoder 76 are preferably adapter cards coupled to a bus in the computer system, but are shown external to the computer system 60 for illustrative purposes. The computer system 60 also includes software, represented by floppy disks 72, which may perform portions of the video decompression or decoding operation and/or may perform other operations, as desired.

Figure 3:
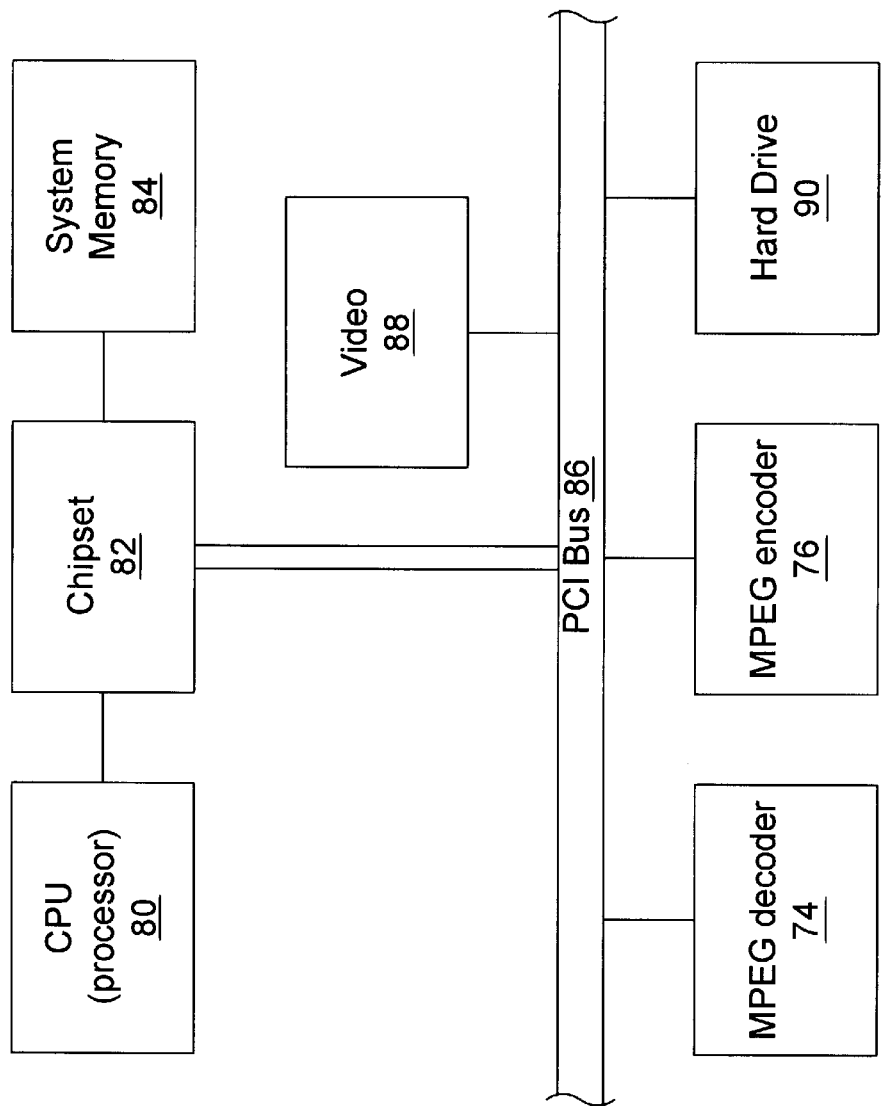
FIG. 3 is a block diagram illustrating the computer system of FIG. 2.

The computer system 60 preferably includes various standard components, including one or more processors, one or more buses, a hard drive and memory. Referring now to FIG. 3, a block diagram illustrating the components comprised in the computer system of FIG. 2 is shown. It is noted that FIG. 3 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86, or another type of bus bridge for interfacing to another type of expansion bus. In FIG. 3, MPEG decoder 74 and MPEG encoder 76 are shown connected to PCI bus 86. Various other components may be comprised in the computer system, such as video 88 and hard drive 90.

As mentioned above, in the preferred embodiment of FIG. 2 the computer system 60 includes or is coupled to one or more digital storage or media storage devices. For example, in the embodiment of FIG. 2, the computer system 60 couples to media storage unit 62 through cable 64. The media storage unit 62 preferably comprises a RAID (Redundant Array of Inexpensive Disks) disk array, or includes one or more CD-ROM drives and/or one or more Digital Video Disk (DVD) storage units, or other media, for storing digital video to be decompressed and/or for storing the resultant decoded video data. The computer system may also include one or more internal RAID arrays, CD-ROM drives and/or may couple to one or more separate Digital Video Disk (DVD) storage units. The computer system 60 also may connect to other types of digital or analog storage devices or media, as desired.

Alternatively, the compressed digital video file may be received from an external source, such as a remote storage device or remote computer system. In this embodiment, the computer system preferably includes an input device, such as an ATM (Asynchronous Transfer Mode) adapter card or an ISDN (Integrated Services Digital Network) terminal adapter, or other digital data receiver, for receiving the digital video file. The digital video file may also be stored or received in analog format and converted to digital data, either externally to the computer system 60 or within the computer system 60.

As mentioned above, the MPEG decoder 74 in the computer system 60 performs video decoding or video decompression functions. In performing video decoding or is video decompression, the MPEG decoder 74 receives temporally compressed frames comprising motion vectors and uses motion compensation techniques to decompress or decode the compressed frames of the digital video file. As discussed further below, the MPEG decoder 74 in the computer system 60 decodes bidirectionally encoded frames, i.e., performs frame reconstruction, with minimal memory. The MPEG decoder 74 preferably decodes each B frame more than once, thereby eliminating the need to store the B frame in its entirety. The MPEG decoder 74 thus performs motion compensation with reduced memory requirements according to the present invention.

It is noted that the system for decoding or decompressing video data may comprise two or more interconnected computers, as desired. The system for decoding or decompressing video data may also comprise other hardware, such as a set top box, either alone or used in conjunction with a general purpose programmable computer. It is noted that any of various types of systems may be used for decoding or decompressing video data according to the present invention, as desired.

Figure 4:
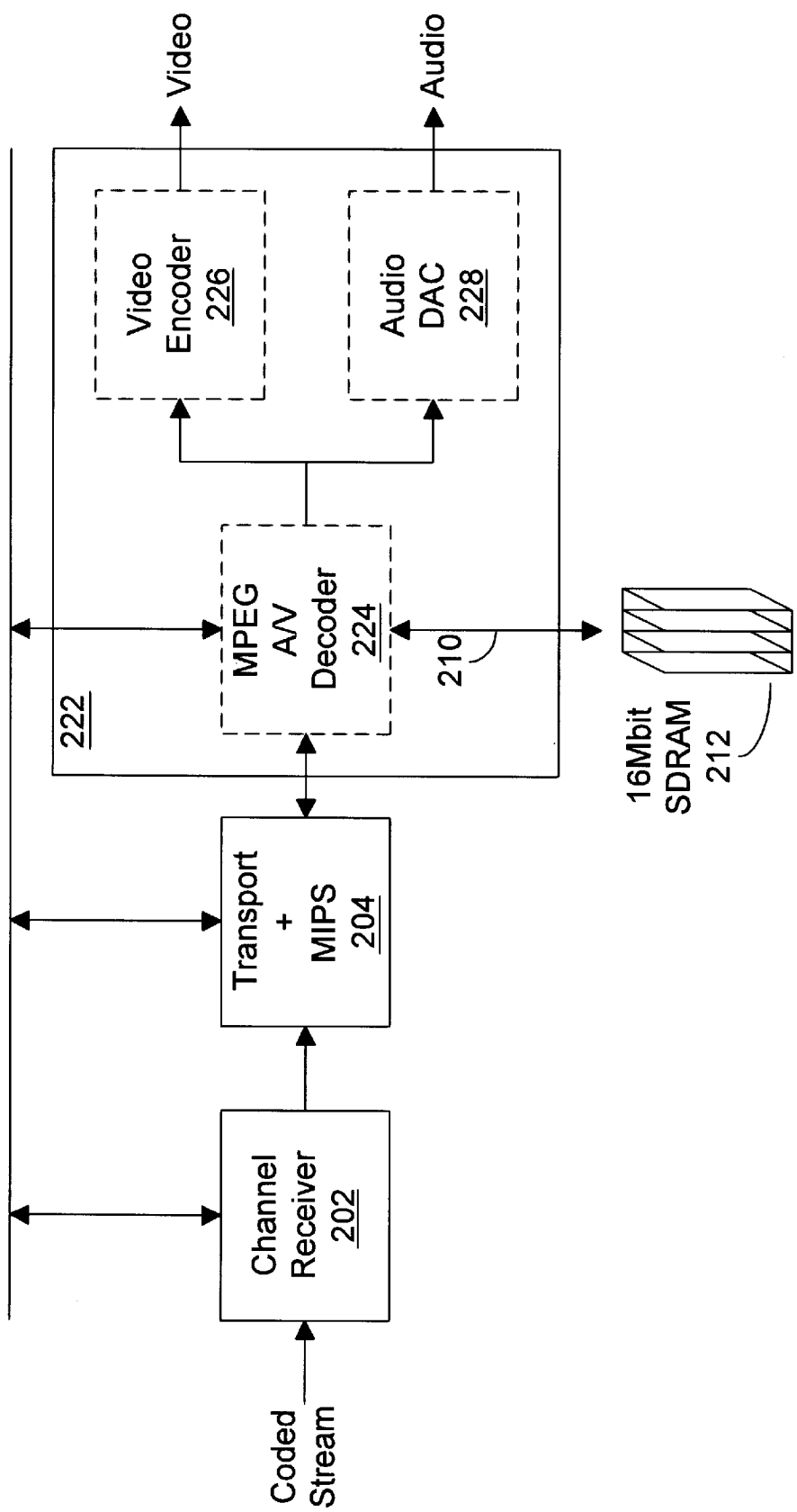
FIG. 4 is a block diagram illustrating an MPEG video decoder system according to one embodiment of the present invention.

FIG. 4—MPEG Decoder Architecture Block Diagram

Referring now to FIG. 4, a block diagram illustrating an MPEG decoder architecture according to one embodiment of the present invention is shown.

As shown, the MPEG decoder architecture includes a channel receiver 202 for receiving one or more coded streams. The encoded video data is in the form of a and is provided to the channel receiver or buffer 202 on a data channel for temporary storage. The encoded video data includes picture information that is representative of a plurality of single frames of motion video. Each encoded frame or picture of motion video is represented in digital form as a sequence of bits. The structure of his sequence preferably conforms to a selected video compression standard, such as the MPEG-1 or MPEG-2 standards, for example. As mentioned above, in the preferred embodiment, the coded stream is an MPEG encoded stream. The MPEG encoded stream may include program content embedded within this stream, as desired. The channel receiver 202 receives the coded stream and optionally provides the coded stream to a transport and system controller block 204.

The transport and system controller block 204 includes transport logic which operates to demultiplex the received MPEG encoded stream into a plurality of multimedia data streams. In other words, where the encoded stream includes a plurality of multiplexed encoded channels or multimedia data streams which are combined into a single stream, such as a broadcast signal provided from a broadcast network, the transport logic in the transport and system controller block 204 operates to demultiplex this multiplexed stream into one or more programs, wherein each of the programs comprise multimedia data streams including video and audio components.

The transport and system controller block 204 preferably includes a system controller which monitors the MPEG system and is programmable to display audio/graphics on the screen and/or execute interactive applets or programs which are embedded in the MPEG stream. In the preferred embodiment, the system controller comprises a MIPS RISC CPU which is programmed to perform system controller functions.

As shown, the transport and system controller block 204 couples to an MPEG decoder block 222. The MPEG decoder block 222 includes an MPEG audio visual decoder 224, also referred to as a reconstruction unit. The MPEG audio visual decoder 224 receives data from the transport and system controller block 204 and operates to perform MPEG decoding to produce a decoded or decompressed signal. As discussed further below, the MPEG decoder 224 operates to decode bidirectionally predictive-coded (B) frames of pixel data with reduced memory requirements according to the present invention.

The MPEG decoder or reconstruction unit 224 decodes the picture data to a form appropriate for display. The MPEG decoder or reconstruction unit 224 preferably incorporates decoder functions for translating the encoded video data into corresponding pixel data for display. For example, the reconstruction unit 224 may include an IDCT pipeline, a motion compensation (MC) pipeline and a merge and store unit for executing the reconstruction process. The IDCT pipeline coordinates the reconstruction of each macroblock of a frame, and the MC pipeline processes any motion compensation information with respect to each macroblock.

As shown, an external memory 212, also referred to as a picture buffer, is coupled to the MPEG A/V decoder. The MPEG A/V decoder 224 utilizes the external memory 212 in the MPEG decode process. The MPEG A/V 224 decoder uses the frame external memory to store decoded MPEG streams which are wed during motion compensation or reconstruction of temporally compressed frames. According to the present invention, the MPEG A/V decoder 224 only uses the external memory 212 to store reference or anchor frames, and the MPEG A/V decoder 224 is not required to use the external memory 212 to store the reconstructed frame data.

The reconstructed frame data from the reconstruction unit 224 is provided to the picture buffer 212 across a data channel 210, The picture buffer 212 preferably includes enough memory for two full anchor frames, referred to as A1 and A2, where the anchor frames are either I or P frames according to the MPEG standard. The data channel 210 is bidirectional and enables the reconstruction unit 224 to retrieve data from either anchor frame A1 or A2 in the picture buffer 212. For example, the anchor frame A1 may store an I frame previously reconstructed by the reconstruction unit 224. The reconstruction unit 224 may retrieve the I frame and merge data from the channel buffer 202 for reconstruction of a P frame. The P frame may then be stored in the picture buffer 212 as the anchor frame A2.

The visual component of the decompressed signal is output from the MPEG A/V decoder 224 and is provided to a video encoder 226. The video encoder 226 operates to convert the digital video stream into a format more appropriate for transmission or display, such as UHF or VHF format. The video encoder logic 226 includes digital to analog (D/A) converters for converting the decoded digital video stream into an analog stream. This analog video stream is then provided as an output of the system as shown.

The audio component of the decoded or decompressed MPEG stream is provided to an audio digital to analog converter (DAC) 228. The audio DAC 228 operates to perform digital to analog conversion on the digital audio signal output from the MPEG A/V decoder 224. The resulting analog audio signals provide an output to the system as shown.

It is ;noted that reconstruction of a temporally compressed frame during MPEG decoding typically uses a fill 16 MB of external memory. However, the MPEG decoder system of the present invention decodes each B frame more than once and performs frame decoding twice as fast as prior art methods, thus reducing the external memory requirement.

The picture buffer 212 is not required to include memory for storage of data for a B frame. As in prior art systems, the anchor frames A1 and A2 are retrieved by the reconstruction unit 224 for reconstructing a B frame, so that the anchor frames A1 and A2 must be fully available in decoded form. However, in prior art systems, the memory size required in the picture buffer for the B frame being reconstructed was generally the same size as or a fraction of he anchor frames A1 and A2. Thus, a picture buffer previously had to include enough memory for up to three full frame stores, including the two anchor frames A1 and A2 and a full or partial B frame.

According to the present invention, however, the picture buffer 212 does not require any storage for B frame reconstructed data. This is achieved without affecting the page hit rate of the DRAMs typically used to implement the picture buffer 212, and without affecting the display of the B frame. Such reduction of the amount of memory required for storing the B frame results in cost savings of the overall decoding system.

Figure 5:
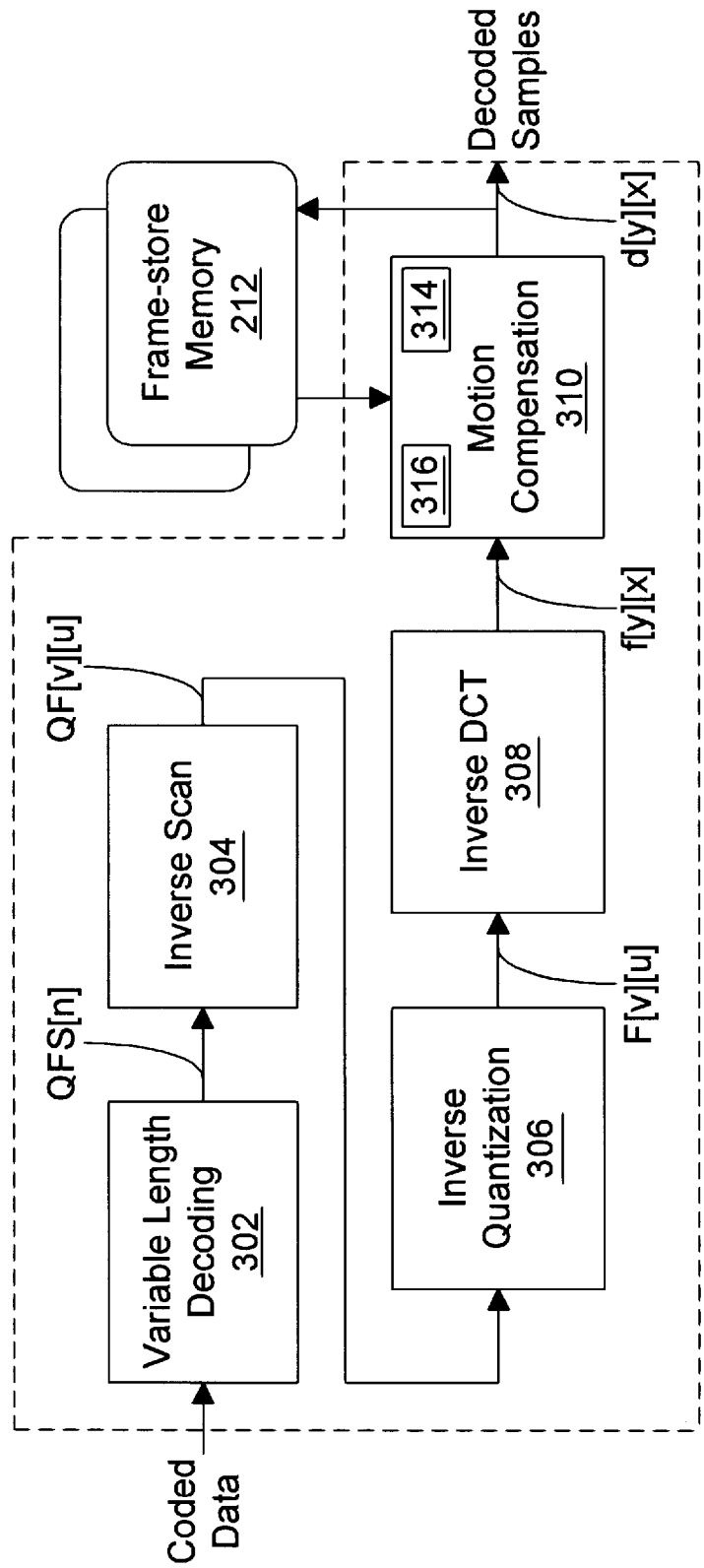
FIG. 5 is a block diagram illustrating the reconstruction unit in the MPEG video decoder of FIG. 4.

FIG. 5—MEG Decoder Logic

Referring now to FIG. 5, a more detailed block diagram illustrating the MPEG decoder 224 which performs motion compensation or frame reconstruction with reduced memory requirements according to the present invention is shown. As shown, the video decoder 224 receives an encoded or compressed digital video stream and outputs an uncompressed digital video stream. The compressed digital video stream is a bitstream of compressed video data which is used to present a video sequence, such as a television segment or movie, onto a screen, such as a television or a computer system. In the preferred embodiment, the compressed digital video stream is compressed using the MPEG-2 compression algorithm, and the video decoder 224 is thus preferably an MPEG-2 decoder. Since the operation of MPEG decoders is well known in the art, details of their operation which are not necessary to the operation of the present invention are omitted for simplicity.

As shown in FIG. 5, the MPEG decoder 224 comprises a Variable Length Decoding block 302 coupled to provide an output to an Inverse Scan block 304, which is coupled to provide an output to an Inverse Quantization block 306, which is coupled to provide an output to an Inverse DCT block 308, which is coupled to provide an output to a motion compensation block 310. The motion compensation block 310 provides an output comprising decoded samples. A frame store memory 212 is coupled to the output of the motion compensation block 310 to receive and store decoded frame data. The motion compensation block 310 is coupled to an output of the frame store memory 212 to receive reference block data from the frame store memory 212 during motion compensation.

As shown in FIG. 5, the Variable Length Decoding block 302 receives coded data and performs variable length decoding. As is well known, the MPEG standard provides that data is compressed for transmission using variable length codes. Thus the Variable Length Decoding block 302 decodes this data and produces an output, referred to as QFS[n]. The QFS[n]output of the Variable Length Decoding block 302 is provided to the Inverse Scan block 304. The Inverse Scan block 304 reverses the zig zag scan ordering of the received data (is this right) and produces an output referred to as QF[v][u]. The output QF[v][u] is provided to the Inverse Quantization block 306. The Inverse Quantization block 306 performs inverse quantization or dc-quantizes the data to produce de-quantized data, referred to as F[v][u]. The output F[v][u] of the Inverse Quantization block 306 is provided to the Inverse DCT block 308, which performs the inverse discrete cosine transform to convert the data from the frequency domain back to the pixel domain. The inverse DCT block 308 produces an output referred to as f[y][x]. The output f[y][x] of the inverse DCT block 308 is provided to the motion compensation block 310.

The output f[y][x] from the inverse DCT block 308 comprises temporally encoded frames of pixel data. The motion compensation block 310 decompresses the temporally compressed frames using motion compensation techniques. As described above, an MPEG encoded stream comprises I, P and B frames. P and B frames are temporally compressed relative to other frames. P frames are temporally compressed relative to prior I or P frames, and B frames are temporally compressed relative to prior or subsequent I or P frames. When a frame is temporally compressed, the frame is partitioned into macroblocks, referred to as target blocks, and then the compression method searches in neighboring frames for blocks which are most similar to the block being encoded. When the best fit block is found, the respective target block is encoded by a motion vector which points to this best fit reference block in the reference frame. The difference between the block being encoded and the best fit block is also computed and transferred in the MPEG stream.

Output pixel values from the motion compensation block 310 are provided to a frame store memory 212. The frame store memory 212 is thus coupled to the motion compensation block 310 and stores one or more reference frames of video data. These reference frames of video data are used in performing motion compensation on temporally compressed frames, such as P and B frames. In general, an MPEG stream includes encoded reference frame data which is transmitted before temporally compressed data that depends on the prior transmitted reference frame data. Thus, incoming temporally encoded frame data, such as P and B frame data, comprises motion vectors which point to reference blocks in a prior transmitted reference frame of video data, which has been stored in the frame store memory 212. The motion compensation block 310 analyzes each motion vector from the incoming temporally compressed data and retrieves a reference block from the frame store memory 212 in response to each motion vector. The motion compensation block 310 includes a local memory or on-chip memory 316 which stores the retrieved reference block. The motion compensation block 310 then uses this retrieved reference block to decompress the temporally compressed data.

In the preferred embodiment, the frame store memory 212 is 1M×16 SDRAM, such as Samsung KM416S1120AT-12, having an operating frequency of 67.5 MHz and a burst size of 4 words. According to the present invention, the frame store memory 212 is not required to store reconstructed B frames. This reduces the required amount of memory.

The motion compensation logic 310 includes a memory controller 314 which accesses a reference block from the frame store memory 212 based upon a received motion vector in a temporally compressed frame. As discussed further below, the memory controller 314 accesses reference block data as needed during frame reconstruction.

Operation of the Invention

A television picture is typically made up of two fields, referred to as the top and bottom field. The top field contains every other scan line in the picture beginning with the first scan line. The bottom field contains every other line beginning with the second line. In other words, the top field comprises the odd horizontal scan lines, and the bottom field comprises the even horizontal scan lines. A television scans or draws all the top field lines, followed by all the bottom field lines, in an interlaced fashion.

A picture encoded using the MPEG2 coding standard may be encoded in progressive (frame picture structure) or interlaced (field picture structure) format. Of interest here is the frame structure picture, which presents the most problems for decoding. The frame structure picture is decoded in progressive scan sequence but must be displayed in interlaced sequence. Prior art systems store the frame temporarily until it is displayed. Prior art systems require a full frame store used to store the frame. Further, there is a field delay between reconstruction and display. The delay is required so that the bottom of the picture can be fully reconstructed by the time it has been displayed at the end of the first field. This latter relationship sets the lower bound of frame store to about 0.5 frames in systems in which the picture is decoded only once.

In other words, macroblocks include information for both even and odd fields for each frame, and reconstruction of each B frame is required to be performed progressively, or in a non-interlaced order. However, display of each frame is in an interlaced order, where an entire first field is displayed first before beginning display of the second field. Thus, B frame reconstruction must lead the display of the B frame by at least half a frame, and the reconstruction process must be completed to finish the display of the entire B frame.

Due to the progressive versus interlaced order between reconstruction and display, an entire or partial memory frame was required in prior art systems to complete reconstruction of each B frame for display. Thus, prior art systems required up to three frame stores of memory. In other words, the picture buffer was required to store between 2.5 and 3 frames of video information. Two frames of storage were necessary for storing two anchor frames. A partial or total third frame of storage was required to store the frame being reconstructed. The two anchor frames were used to reconstruct the B frame into the third frame storage area.

In order to reduce the memory required below 0.5 frames, the 0.5 frame delay must be eliminated. According to the present invention, the picture is reconstructed twice as fast so that the bottom of the picture has been reconstructed by the time the end of the first field is displayed. Also according to the present invention, the picture is reconstructed twice, since data belonging to the bottom field cannot be stored until that field is displayed, and such storage would require a field store.

Figure 6:
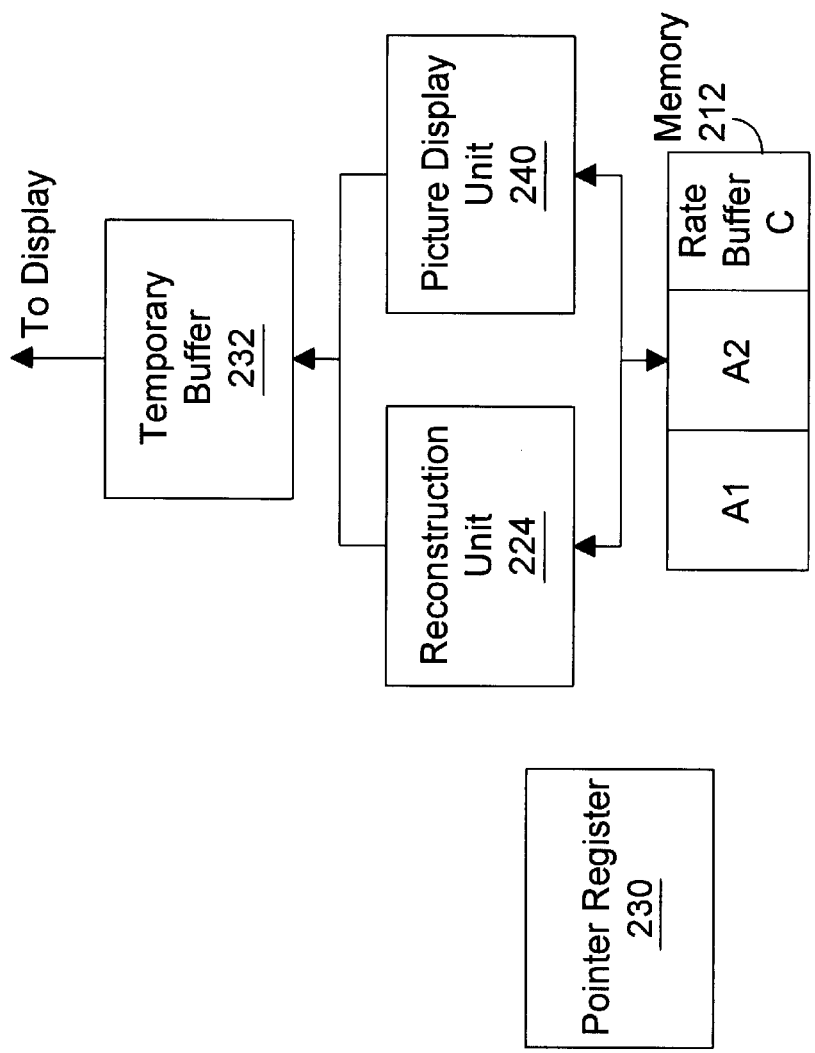
FIG. 6 is a block diagram an MPEG video decoder system according to the preferred embodiment of the present invention.

FIG. 6—Video Decoder of the Preferred Embodiment

FIG. 6 is a block diagram of a video decoder system according to the preferred embodiment of the present invention. The block diagram of FIG. 6 is used to illustrate operation of the present invention. Elements in FIG. 6 which are similar or identical to elements in FIG. 4 have the same reference numerals for convenience. As shown, the system comprises a large semiconductor memory 212, a picture reconstruction unit 224, a picture display unit 240, a pointer register 230 and a temporary buffer 232. The large semiconductor memory 212 is further partitioned into separate buffers used for anchor pictures (A1, A2) and a rate buffer C which stores the temporally compressed frame, e.g., the compressed B frame or P frame.

The pointer register 230 stores the location of the first byte of the compressed picture, which is stored in the rate buffer C. The picture reconstruction unit 224 operates to decode or reconstruct the B frame twice, once each during a first field time and a second field time. The first field time substantially corresponds to the time when the first or top field of the picture is displayed, and the second field time substantially corresponds to the time when the second or bottom field of the picture is displayed.

During the first field time, the picture reconstruction unit 224 reads the compressed picture data from the rate buffer C, where the picture is decoded. The picture reconstruction unit 224 operates to write the top field data to the temporary buffer 232. The bottom field data is discarded. In the preferred embodiment, the picture reconstruction unit 224 operates to decode one slice of picture data, and the picture reconstruction unit 224 transfers the top field data of this slice, preferably as the data is decoded, to the temporary buffer 232. After one slice of the picture has been decoded, and the top field data from this slice has been transferred to the temporary buffer 232, the data in the temporary buffer 232 is retrieved by the picture display unit 240 and is output for display. This process continues for the entire picture to display all of the top or first field, Thus, the entire picture is decoded or reconstructed, and only data from the top field is written to the temporary buffer 232 for display.

During the second field time, the picture reconstruction unit 224 again reads the compressed picture data from the rate buffer C, again using the pointer register 230 as a reference to the beginning of the compressed picture. The compressed picture is thus again sent to the picture reconstruction unit 224, where it is again decoded. The picture reconstruction unit 224 operates to write the bottom field data to temporary buffer 232, and the top field data is discarded. After one slice of the picture has been decoded, and the bottom field data from this slice has been transferred to the temporary buffer 232, the data in temporary buffer 232 is retrieved by the picture display unit 240 and is for display. This process continues for the entire picture to display all of the bottom or second field.

It is noted that the reconstructed picture data is never written to the memory 212 during reconstruction of B-frames. Rather, portions of the reconstructed picture data are stored in the much smaller temporary buffer 232 prior to display.

The size of the temporary buffer 232 is preferably sufficient to store a section of image nominally 720 pixels by 8 lines for each of luma and chroma data, though other embodiments are possible for images of different horizontal resolution. This means that the memory would be 92160 bits. In the preferred embodiment, the size of the temporary buffer 232 is increased to prevent the reconstruction and display process from writing or reading the same location at the same time, It is noted that the temporary buffer 232 is about 32 times smaller than the external frame store required in the best implementation of prior art methods. This allows the temporary buffer 232 to be comprised on the same monolithic substrate as the decoder itself.

In one preferred embodiment, the temporary buffer 232 is implemented as an array of 6 transistor SRAM cells. In another preferred embodiment the temporary buffer 232 is implemented as an array of 4 transistor SRAM cells. In another preferred embodiment, the temporary buffer 232 is implemented as an array of 3 transistor DRAM cells. In another preferred embodiment, the temporary buffer 232 is implemented as an array of 1 transistor DRAM cells. In the case of the DRAM embodiments, the array does not require refresh since each cell is accessed at least once every 8 scan line times (nominally 8*64 us), which is substantially lower than the retention period of a nominal DRAM cell.

Therefore, the present invention reconstructs the B-picture twice, once in each field time. The present invention thus eliminates the storage requirement of the B-frame entirely. The present invention eliminates the storage requirement of the B-frame without substantially increasing the bandwidth required from external semiconductor memory when compared to prior art methods.

FIG. 7—Flowchart Diagram

Figure 7A:
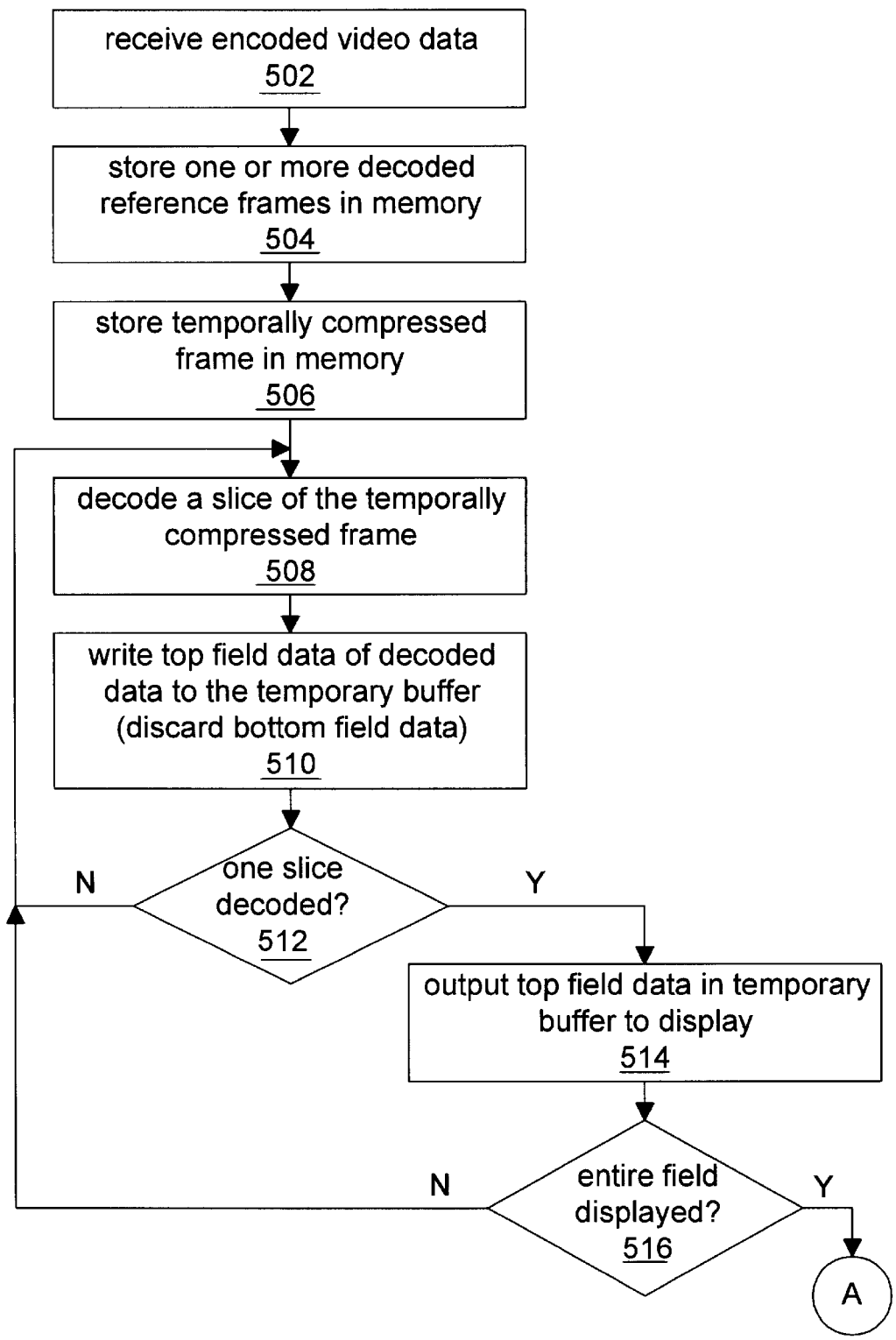
FIGS. 7A and 7B are flowchart diagrams illustrating operation of the present invention.
Figure 7B:
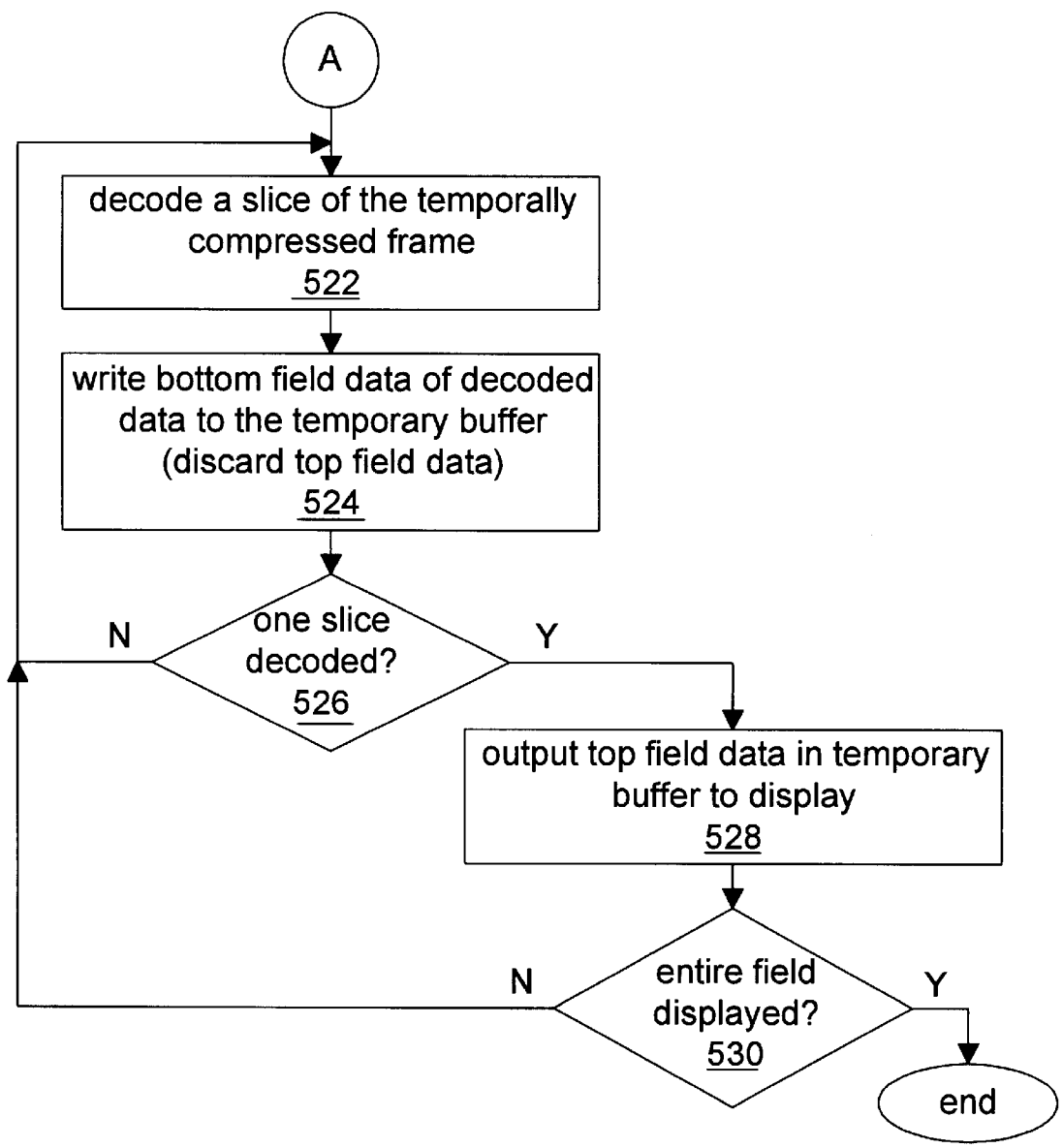

Referring now to FIGS. 7A and 7B, a flowchart diagram is shown illustrating operation of a method of decoding bi-directionally predictive coding frames according to the preferred embodiment of the invention. It is noted that the method of the present invention may be used to decode other types of frames, such as predicted or P frames. As discussed above, the method of the present invention operates to decode or reconstruct a frame without requiring storage over the frame being reconstructed in the picture memory.

As shown, in step 502 the MPEG decoder or reconstruction unit 224 receives encoded video data. For example, a channel buffer in the MPEG decoder 224 receives the encoded video data stream. In step 504 the MPEG decoder 224 stores one or more decoded reference frames in the picture memory 212. Here it is presumed that the MPEG decoder or reconstruction unit 224 has received video data corresponding to I and/or P frames and has already decoded these frames to produce decoded frames. As discussed above, I and P frames are used as reference frames or anchor frames for temporally compressed frames, wherein temporally compressed frames include P and B frames.

Thus, stop 504 presumes that one or more of these reference frames have been decoded and stored in a picture memory.

In step 506 the MPEG decoder 224 receives and stores a temporally compressed frame in memory, preferably a bi-directionally encoded frame or B frame. Where the temporally compressed frame is a B frame, the one or more decoded reference frames stored in step 504 are comprised of the two anchor or reference frames as shown in FIG. 6.

In step 508 the MPEG decoder or reconstruction unit 224 decodes a slice of the temporally compressed frame. In step 508 the temporally compressed picture data is read form the rate buffer C into the reconstruction unit 224 where the picture is decoded. The temporally compressed picture or frame is decoded using MPEG motion compensation and reconstruction techniques, as is well known in the art. The MPEG decoder 224 preferably decodes a slice of the temporally compressed frame, wherein a slice preferably comprises a horizontal row of macro blocks. However, it is noted that any amount of the temporally compressed frame may be decoded at a time as desired.

As the slice of the temporally compressed frame is decoded in step 508, in step 510 the reconstruction unit 224 writes the first field or the top field of the decoded data to the temporary buffer 232. The bottom field data or second field data is discarded. It is noted that the MPEG decoder or reconstruction unit 224 operates to write the top field of the decoded, data to the temporary buffer 232 in conjunction with decoding the slice of the temporally compressed frame in step 508. Thus, steps 508 and 510 preferably operate substantially simultaneously. In other words, as data is decoded in the slice of the temporally compressed frame in step 508, the top field of this decoded data is written into the temporary buffer 232 in step 510. It is noted that steps 508 and 510 continuously repeat until one slice of the temporally compressed frame has been decoded, and the top field data of the slice has been stored in the temporary buffer 232.

After one slice has been determined to be decoded, and the corresponding top field data from this slice has been stored in the temporary buffer 232 in step 512, in step 514 the data in the temporary buffer 232 which corresponds to the top field of the decoded data is output for display. In step 514 the display controller 240 operates to transfer the top field of data from the temporary buffer 232 to the display unit for display.

If the entire top field or first field is determined to have been decoded and displayed in step 516, then operation proceeds to step 522 (FIG. 7B). If the entire top field of the frame being decoded is determined to have not been decoded and displayed in step 516, then operation returns to step 508, and the MPEG decoder or reconstruction unit 224 operates to repeat step 508–516 to decode the next slice of the frame and display the top field of data from this decoded slice. It is noted that steps 508–516 repeat until every slice of the frame has been decoded and the top field of this decoded data has been transferred to the temporary buffer 232 and then out for display. It is noted that the bottom field data from the decoded frame is discarded during this period of time. Steps 508–516 are performed during a first field time, or during the time that the first field of the temporally compressed frame is decoded and displayed by the display unit.

After the top field has been decoded and displayed, then the second field time begins. During the second field time, the temporally compressed picture is again reconstructed to decode and display the bottom field in steps 522–530. Operation of the reconstruction unit 224 in steps 522–530 is substantially similar to operation in steps 508–516, except that the bottom field data is transferred to the temporary buffer 232, and the top field data is discarded.

As shown, in step 522 the MPEG decoder or reconstruction unit 224 again decodes a slice of the temporally compressed frame. In step 522 the temporally compressed picture data is read form the rate buffer C into the reconstruction unit 224 where the picture is decoded. As mentioned above, the MPEG decoder 224 preferably decodes a slice of the temporally compressed frame, wherein a slice preferably comprises a horizontal row of macro blocks.

However, it is noted that any amount of the temporally compressed frame may be decoded at a time as desired.

As the slice of the temporally compressed frame is decoded in step 522, in step 524 the reconstruction unit 224 writes the second or bottom field of the decoded data to the temporary buffer 232. The top field data or first field data is discarded. It is noted that the MPEG decoder or reconstruction unit 224 operates to write the bottom field of the decoded data to the temporary buffer 232 in conjunction with decoding the slice of the temporally compressed frame in step 522. Thus, steps 522 and 524 preferably operate substantially simultaneously. In other words, as data is decoded in the slice of the temporally compressed frame in step 522, the bottom field of this decoded data is written into the temporary buffer 232 in step 524. It is noted that steps 522 and 524 continuously repeat until one slice of the temporally compressed frame has been decoded, and the bottom field data of the slice has been stored in the temporary buffer 232. Thus steps 522 and 524 correspond to steps 508 and 510 of FIG. 7A.

After one slice has been determined to be decoded in step 526, and the corresponding bottom field data from this slice has been stored in the temporary buffer 232, in step 528 the data in the temporary buffer 232 which corresponds to the bottom field of the decoded data is output for display. In step 528 the display controller 240 operates to transfer the bottom field of data from the temporary buffer 232 to the display unit for display. If the entire bottom field or second field is determined to have been decoded and displayed in step 530, then operation completes for this frame or picture. If the entire bottom field of the frame being decoded is determined to have not been decoded and displayed in step 530, then operation returns to step 522, and the MPEG decoder or reconstruction unit 224 operates to repeat step 522–530 to decode the next slice of the frame and display the bottom field of data from this decoded slice. It is noted that steps 522–530 repeat until every slice of the frame has been decoded and the bottom field of this decoded data has been transferred to the temporary buffer 232 and then out for display. It is noted that the top field data from the decoded frame is discarded during this period of time. Steps 522–530 are performed during a second field time, or during the time that the second field of the temporally compressed frame is decoded and displayed by the display unit.

Figure 8:
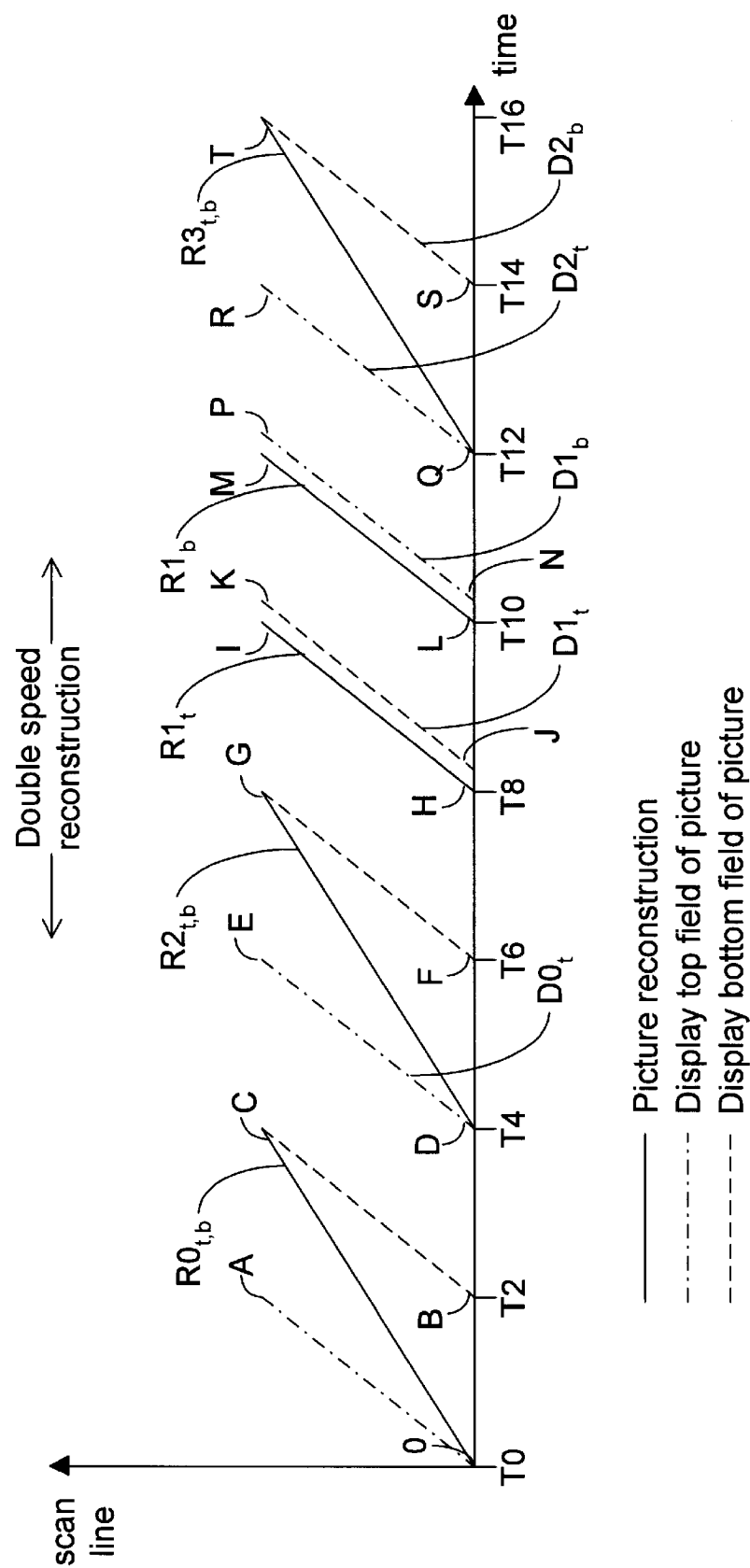
FIG. 8 is a graph illustrating operation of the video decoder system according to the present invention.

FIG. 8—Picture Reconstruction vs. Display

FIG. 8 is a graph illustrating operation of the decoder system operating according to the present invention. Each of the scan lines forming a B frame are referenced along the y-axis and time is plotted along the x-axis of the graph. As shown, FIG. 8 illustrates picture reconstruction vs. display according to the preferred embodiment for an IPBP sequence. Between times T8 and T12, a first B frame, referred to as R1, is reconstructed twice, as illustrated by the two solid lines beginning at times T8 and T10, respectively.

The reconstruction of frames occurs in a progressive manner, where each macroblock for each slice is reconstructed one at a time. Each macroblock includes data for a contiguous 16-pixel by 16-line portion of the frame. Thus, each macroblock incorporates data for both fields, where the consecutive lines of data are stored at consecutive locations within the picture buffer.

At time T0, decoding or reconstruction of the I frame $R0_{t,b}$(R0) begins. Between times T0 and T4, the I frame R0 is reconstructed, as shown by the solid line between the Origin O and point C. The dash-dot line plotted between points O and A, between times T0 and T2, illustrates display of the first or top field from a prior frame, whose reconstruction is not shown in FIG. 8. Likewise, the dashed line plotted between points B and C, between times T2 and T4, illustrates display of the second or bottom field from this prior frame.

At time T4, decoding or reconstruction of the P frame R2 begins. Between times T4 and T8, the P frame R2 is reconstructed, as shown by the solid line between points D and G. The dash-dot line labeled $D0_t$ plotted between points D and E, between times T4 and T6, illustrates display of the first or top field from the R0 frame. Likewise, the dashed line labeled $D0_b$ plotted between points F and G, between times T6 and T8, illustrates display of the second or bottom field from the R0 frame.

At time T8, reconstruction of the B frame begins. As mentioned above, each B frame is reconstructed twice during display, thus eliminating the need to store the reconstructed data in the memory. Between times T8 and T12, a first B frame, referred to as R1, is reconstructed twice, as illustrated by the two solid lines beginning at times T8 and T10, with the first solid line being between points H and I, and the second solid line being between points L and M. The dash-dot line labeled $D1_t$ plotted between points J and K, approximately between times T8 and T10, illustrates display of the first or top field from the R1 frame. Likewise, the dashed line labeled $D1_b$ plotted between points N and P, approximately between times T10 and T12, illustrates display of the second or bottom field from the R1 frame.

After the B frame has been reconstructed and displayed between times T8 and T12, reconstruction begins on another P frame, referred to as $R3_{t,b}$ (R3) at tine T12. The P frame R3 is reconstructed between times T12 and T16, as shown by the solid line between points Q and T. The dash-dot line labeled $D2_t$ plotted between points Q and R, between times T12 and T14, illustrates display of the first or top field from the R2 frame, previously reconstructed between times T4 and T8. Likewise, the dashed line labeled $D2_b$ plotted between points S and T, between times T14 and T16, illustrates display of the second or bottom field from the R2 frame.

Thus, the B frame is reconstructed twice, and no field delay occurs between reconstruction and display of the respective fields.

FIG. 8—Table

Reconstructing the picture at twice the rate ordinarily would require that the semiconductor memory used to store the anchor pictures be accessed twice as often in the same unit time. This would cause the bandwidth required in the semiconductor memory to increase, possibly beyond that which can be sustained by commonly available semiconductor memories. The video decoder system and method of the present invention advantageously accomplishes the double-speed reconstruction without increasing the overall bandwidth required in the system.

Referring now to FIG. 8, a table is shown which illustrates operation of the present invention compared to prior art methods. In the table of FIG. 8, a benchmark comprising the number of bit-accesses per pixel is used to compare different methods, including the prior art, a simple 2x reconstruction, and the method of the present invention. To reconstruct and display a B-picture using the normal prior art method requires a total of 57.25 bit-accesses per pixel. Note that accesses are required for is reconstruction, write back of the picture, and read of the picture for display. If the reconstruction rate is increased to allow for double speed decoding, the number of bit-accesses per pixel increases to 86.5 (49% more). This occurs since every pixel in the two anchor frames needs to be accessed twice. However, the number of accesses for write back and display does not increase, since pixels reconstructed for the opposite parity field do not need to be read or written more than once.

The present invention utilizes the fact that, once the 0.5 frame delay has been eliminated by reconstructing the picture twice, it is no longer necessary to write the B-frame back into the main semiconductor memory at all. Since the delay from reconstruction to display is now small, sections of the reconstructed picture can be buffered in a small semiconductor memory on the same monolithic silicon die as the decoder circuit, eliminating the reads and writes formally required to support the display. The table show that the new method decreases the bit-accesses per pixel to 58.5, which is ~2% more than the prior art method.

It is important to recognize that once the 0.5 frame delay has been eliminated from B-frames, it must also be eliminated from I or P-picture reconstruction, since the frames must be presented at the same rate. However, since I and P-frames are never reconstructed and displayed in the same frame period, it is not necessary to reconstruct them more than once. Thus I and P frames are preferably reconstructed exactly as in the prior art.

The present invention thus provides numerous advantages over the prior art. First, the memory required to store reconstructed B-frame data is reduced to zero frames, as compared to the previous best method of 0.528 frames. This considerably reduces the required memory size. The present invention yields a saving of over 2627600 bits for a commonly used picture size of 720×576 pixels. The overall performance requirements of external semiconductor memory does not substantially increase, allowing the invention to be used without increasing the overall system cost.

Thus the present invention allows net savings of up to 4976640 bits when compared to the most common prior art method, which requires a full frame store for B frame reconstruction, or 2627600 bits when compared to the best method in the prior art. Since semiconductor memory represents a large portion of the cost of a video decoder system, the present invention provides substantial cost benefits.

Other uses of the Temporary Buffer

Since the temporary buffer 232 is positioned between the reconstruction process or frame memory and the display, the delay intrinsic in the memory can be used for post processing functions on the display. For example, the vertical aspect ratio of the screen may be altered by filtering the data in T using the intrinsic delay in T to allow filters with multiple taps to be employed.

In one embodiment, pulldowns and freeze frames are implemented by repeatedly decoding the frame each field time and displaying the selected field.

Conclusion

Therefore, the present invention provides a video decoder system and method, preferably an MPEG2 video decoder, which reconstructs B-frames using no external semiconductor memory for intermediate storage of the B-frames. According to the invention, the MPEG2 decoder 224 decodes the picture in its entirety more than once. The video decoder includes a temporary buffer which is much smaller than the B frame memory required in prior art systems. In one embodiment, the temporary buffer 232 is located on the same monolithic substrate as the decoder. As noted above, the temporary buffer 232 may be constructed from an array of SRAM cells or an array of DRAM cells. In an alternate embodiment, the MPEG2 decoder 224 and the semiconductor memory 212 used for frame store are implemented on separate pieces of silicon.

In one embodiment, the temporary buffer 232 is recombined with the memory 212, wherein the memory 212 has sufficient performance to perform the temporary buffer functions. In another embodiment of the invention, the semiconductor memory 212 and the MPEG2 decoder 224 are implemented on a single monolithic piece of silicon. In this embodiment, the temporary buffer 232 may optionally be recombined with the memory 212.

The present invention also contemplates embodiments where the architecture of the present invention is used for the production of special visual effects, such as freeze frame and 3:2 pulldown. As noted above, the temporary buffer may also be used to implement post processing functions, including vertical resampling. The present invention may also be used in other video codecs which do not adhere to the MPEG 2 standard, but which are substantially similar.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A video decoder system for decoding and displaying a bidirectionally predictive-coded (B) frame of pixel data, wherein the B frame includes data corresponding to first and second fields of the frame, the video decoder system comprising:

a temporary buffer for storing reconstructed B frame data;

a reconstruction unit coupled to the temporary buffer, wherein the reconstruction unit is operable to perform reconstruction on the B frame to produce reconstructed picture data during a first field time, wherein the reconstruction unit is operable to write said reconstructed picture data corresponding to the first field to the temporary buffer, wherein the reconstruction unit is operable to perform reconstruction on the B frame to produce reconstructed picture data during a second field time, wherein the reconstruction unit is operable to write said reconstructed picture data corresponding to the second field to the temporary buffer;

wherein the temporary buffer is adapted for coupling to a display unit, wherein the temporary buffer operates to periodically output said reconstructed data to the display unit to display said first and second fields of the B frame.

2. The video decoder system of claim 1, further comprising:

a picture memory which stores two anchor frames, wherein the B frame is encoded relative to the two anchor frames stored in the picture memory;

wherein the picture memory does not store any of the reconstructed picture data.

3. The video decoder system of claim 1, wherein the reconstruction unit is operable to write said reconstructed picture data corresponding to the first field to the temporary buffer during said first field time; and wherein the reconstruction unit is operable to write said reconstructed picture data corresponding to the second field to the temporary buffer during said second field time.

4. The video decoder system of claim 3, wherein the reconstruction unit does not use said reconstructed picture data corresponding to the second field during said first field time; and wherein the reconstruction unit does not use said reconstructed picture data corresponding to the first field during said second field time.

5. The video decoder system of claim 1,
wherein the reconstruction unit is operable to perform reconstruction on the entire B frame to produce reconstructed picture data during said first field time, and
wherein the reconstruction unit is operable to perform reconstruction on the entire B frame to produce reconstructed picture data during said second field time.

6. The video decoder system of claim 1, wherein the B frame is comprise of a plurality of slices, wherein each of said slices comprises a plurality of macroblocks of pixel data;
wherein the temporary buffer stores reconstructed picture data corresponding to only one of said slices.

7. The video decoder system of claim 6, wherein the reconstruction unit is operable to perform reconstruction on slices comprising the B frame to produce reconstructed picture data, wherein the reconstruction unit is operable to write said reconstructed picture data corresponding to said slices as reconstruction on said slices is performed.

8. The video decoder system of claim 1, wherein the reconstruction unit and the temporary buffer are both comprised on a single monolithic semiconductor substrate.

9. The video decoder system of claim 1, further comprising:
a picture memory which stores two anchor frames, wherein the B frame is encoded relative to the two anchor frames stored in the picture memory;
wherein the temporary buffer is comprised in said picture memory.

10. The system of claim 1, further comprising:
a display unit coupled to the temporary buffer, wherein the temporary buffer operates to periodically output said reconstructed data to a video display unit to display said first and second fields of the B frame.

11. A method for decoding a temporally compressed frame in a system comprising a reconstruction unit and a picture memory, wherein the picture memory stores one or more anchor frames, wherein the temporally compressed frame is encoded with respect to said one or more anchor frames stored in the picture memory, and wherein the reconstruction unit operates to decode the temporally compressed frame using pixel data from the one or more anchor frames stored in the picture memory, the method comprising:
receiving encoded video data;
storing one or more anchor frames in the picture memory;
decoding the temporally compressed frame during a first field time, wherein said decoding uses the one or more anchor frames stored in the picture memory, wherein said decoding produces reconstructed picture data;
transferring top field data from the reconstructed picture data to a display unit for display, wherein bottom field data from the reconstructed picture data is not used;
decoding the temporally compressed frame during a second field time, wherein said decoding uses the one or more anchor frames stored in the picture memory, wherein said decoding produces said reconstructed picture data; and
transferring bottom field data from the reconstructed picture data to a display unit for display, wherein top field data from the reconstructed picture data is not used.

12. The method of claim 11, wherein the method does not includes storing any of said reconstructed picture data in the picture memory.

13. The method of claim 11, wherein said transferring the top field data from the reconstructed picture data to the display unit for display comprises:
periodically transferring portions of the top field data from the reconstructed picture data to a temporary buffer; and
periodically transferring said portions of the top field data from the temporary buffer to the display unit;
wherein said transferring the bottom field data from the reconstructed picture data to the display unit for display comprises:
periodically transferring portions of the bottom field data from the reconstructed picture data to the temporary buffer; and
periodically transferring said portions of the bottom field data from the temporary buffer to the display unit.

14. The method of claim 13,
wherein said transferring top field data from the reconstructed picture data to the temporary buffer occurs during said first field time; and
wherein said transferring bottom field data from the reconstructed picture data to the temporary buffer occurs during said second field time.

15. The method of claim 14, further comprising:
transferring top field data from portions of said reconstructed picture data to the temporary buffer during said first field time; and
transferring bottom field data from portions of said reconstructed picture data to the temporary buffer during said second field time.

16. The method of claim 11 further comprising:
displaying said first field data on the display unit during said first field time; and
displaying said second field data on the display unit during said second field time.

* * * * *

UNITED STATES PATENT AND TRADEMARK OFFICE
CERTIFICATE OF CORRECTION

PATENT NO. : 5,818,533

DATED : October 6, 1998

INVENTOR(S) : Auld et al.

It is certified that error appears in the above-identified patent and that said Letters Patent is hereby corrected as shown below:

In the Claims:

Claim 6, col. 23, line 9, please delete "comprise" and substitute "comprised".

Signed and Sealed this

Nineteenth Day of January, 1999

Attest:

Attesting Officer

*Acting Commissioner of Patents and Trademarks*